(12) United States Patent
Aoki et al.

(10) Patent No.: US 11,364,916 B2
(45) Date of Patent: Jun. 21, 2022

(54) VEHICLE CONTROL APPARATUS THAT IS MOUNTED IN VEHICLE

(71) Applicant: Toyota Jidosha Kabushiki Kaisha, Toyota (JP)

(72) Inventors: Kenichiro Aoki, Miyoshi (JP); Tadashi Omachi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/536,635

(22) Filed: Aug. 9, 2019

(65) Prior Publication Data
US 2020/0094844 A1 Mar. 26, 2020

(30) Foreign Application Priority Data
Sep. 26, 2018 (JP) .............................. JP2018-180399

(51) Int. Cl.
*B60W 40/072* (2012.01)
*B60W 40/105* (2012.01)
*B60W 30/12* (2020.01)

(52) U.S. Cl.
CPC .......... *B60W 40/072* (2013.01); *B60W 30/12* (2013.01); *B60W 40/105* (2013.01); *B60W 2520/10* (2013.01); *B60W 2552/30* (2020.02)

(58) Field of Classification Search
CPC ................................................. B60W 40/072
See application file for complete search history.

(56) References Cited

U.S. PATENT DOCUMENTS

| 2013/0006473 A1* | 1/2013 | Buerkle .......... B60W 30/18145 |
| | | 701/41 |
| 2015/0224987 A1* | 8/2015 | Tachibana .............. G08G 1/166 |
| | | 701/1 |
| 2019/0283746 A1* | 9/2019 | Shalev-Shwartz ... G05D 1/0246 |

FOREIGN PATENT DOCUMENTS

| JP | 2007-148964 A | 6/2007 |
| JP | 2014-218098 A | 11/2014 |
| WO | 2014/178445 A1 | 11/2014 |

* cited by examiner

*Primary Examiner* — Imran K Mustafa
(74) *Attorney, Agent, or Firm* — Dinsmore & Shohl LLP

(57) ABSTRACT

A vehicle control apparatus includes an electronic control unit configured to: acquire lane information including a curvature of a curve located ahead in a traveling direction of the vehicle; acquire target vehicle information as information on a target vehicle, based on the lane information and the target vehicle information, a target trajectory; perform a target trajectory modification process for offsetting the target trajectory determined from the lane information in such a direction as to move away from the target vehicle, when the vehicle approaches the target vehicle; set an offset amount of the target trajectory in accordance with the curvature of the curve, when the vehicle approaches the target vehicle from an outer side of the curve, in the target trajectory modification process; and cause the vehicle to automatically run along the target trajectory modified through the target trajectory modification process.

8 Claims, 8 Drawing Sheets

VEHICLE CONTROL APPARATUS THAT IS MOUNTED IN VEHICLE

CROSS-REFERENCE TO RELATED APPLICATION

This application claims priority to Japanese Patent Application No. 2018-180399 filed on Sep. 26, 2018, incorporated herein by reference in its entirety.

BACKGROUND

1. Technical Field

The present disclosure relates to a vehicle control apparatus that is mounted in a vehicle.

2. Description of Related Art

In Japanese Patent Application Publication No. 2014-218098 (JP 2014-218098 A), there is disclosed an art concerning a driving assist device that provides assistance in running through automated driving. According to this art, when there is a surrounding object in an adjacent lane, a target spot is changed in such a manner as to move away from the surrounding, object within a runnable region, and a target trajectory is generated in such a manner to pass an own vehicle position and the target spot.

SUMMARY

The art of Japanese Patent Application Publication No. 2014-218098 (JP 2014-218098 A) is effective to some extent in alleviating an anxiety about the possibility of a vehicle coining into contact with the surrounding object. However, according to the art of Japanese Patent Application Publication No. 2014-218098 (JP 2014-218098 A), in the case where, for example, there is a surrounding object in an adjacent lane on an inner side of a curve, the target trajectory is generated in such a direction as to deviate toward an outer side of the curve. In this case, the vehicle runs along the trajectory deviating toward the outer side of the curve through automated driving, so a driver of the vehicle may develop a psychological feeling of strangeness.

The present disclosure provides a vehicle control apparatus that can restrain a driver of a vehicle from developing a psychological feeling of strangeness when the vehicle runs on a curve through automated driving.

An aspect of the disclosure provides a vehicle control apparatus that is mounted in a vehicle. The vehicle control apparatus includes at least one electronic control unit configured to: acquire lane information including a curvature of a curve located ahead in a traveling direction of the vehicle; acquire target vehicle information as information on a target vehicle that is to be overtaken by the vehicle, that is to run side by side with the vehicle, or that is to pass the vehicle; generate, based on the lane information and the target vehicle information, a target trajectory for causing the vehicle to automatically run within a runnable region; perform a target trajectory modification process for offsetting the target trajectory determined from the lane information in such a direction as to move away from the target vehicle, when the vehicle approaches the target vehicle; set an offset amount of the target trajectory in accordance with the curvature of the curve, when the vehicle approaches the target vehicle from an outer side of the curve, in the target trajectory modification process; and cause the vehicle to automatically run along the target trajectory modified through the target trajectory modification process.

The psychological feeling of strangeness caused by running along a trajectory deviating toward the outer side of the curve differs depending on the curvature of the curve. According to the aspect of this disclosure, when the vehicle approaches the target vehicle midway on the curve from the outer side thereof, the offset amount of the target trajectory toward the outer side of the curve is set in accordance with the curvature of the curve. Thus, both the psychological feeling of strangeness caused by approaching the target vehicle through automated driving and the psychological feeling of strangeness caused by the deviation of the vehicle toward the outer side of the curve can be alleviated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

The embodiments of the present disclosure will be described hereinafter with reference to the drawings. It should be noted, however, that when numerals representing the numbers, quantities, amounts, and ranges of respective elements in the following embodiments are mentioned, this disclosure should not be limited to the mentioned numerals, unless otherwise specified or obviously identified as such in principle. Besides, structures, steps, and the like described in the following embodiments are not necessarily indispensable for this disclosure, unless otherwise specified or obviously identified as such in principle.

1. First Embodiment

1-1. Outline of Lane Change Control Performed by Vehicle Control Apparatus

Figure 1:
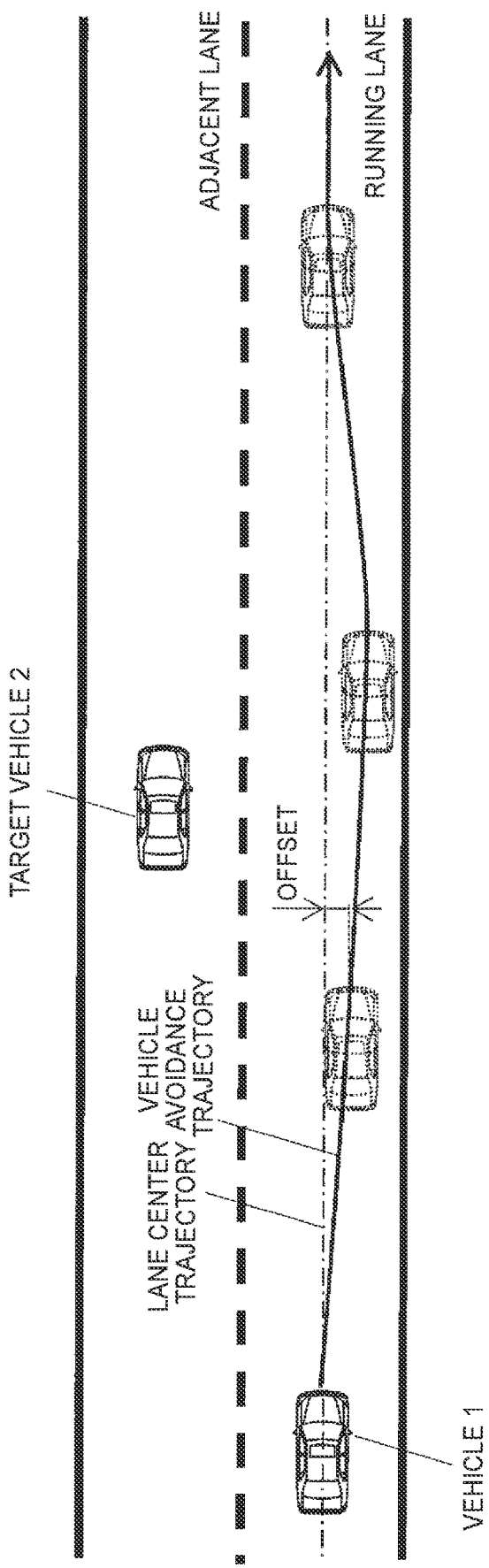
FIG. 1 is a conceptual view for illustrating automated driving control that is performed by a vehicle control apparatus according to the first embodiment.

A vehicle control apparatus is mounted in a vehicle, and performs automated driving control for causing the vehicle to automatically run along a target trajectory. FIG. 1 is a conceptual view for illustrating automated driving control that is performed by the vehicle control apparatus according to the first embodiment. In the following description, the vehicle that is mounted with the vehicle control apparatus will be referred to as "a vehicle 1", and a lane in which the vehicle 1 runs will be referred to as "a running lane". Besides, each of vehicles running around the vehicle 1 will be referred to as "a surrounding vehicle". Besides, that one of the surrounding vehicles which runs in an adjacent lane that is adjacent to the running lane of the vehicle 1 and which is to be overtaken by the vehicle 1, to run side by side with the vehicle 1, or to pass the vehicle 1 will be referred to as "a target vehicle 2".

In automated driving control, the vehicle control apparatus generates a target trajectory according to a lane plan. For example, the vehicle control apparatus generates, as the target trajectory, a lane center trajectory obtained by tracing a center of the running lane in a width direction thereof. Besides, the vehicle control apparatus acquires peripheral information on the vehicle 1, and determines, based on the acquired peripheral information, whether or not the target trajectory of the vehicle 1 needs to be modified. This peripheral information includes not only the presence/absence of surrounding vehicles, but also inter-vehicle distances from the surrounding vehicles and relative speeds with respect to the surrounding vehicles. Then, the vehicle control apparatus performs a target trajectory modification process for offsetting the target trajectory in such a direction as to move away from the target vehicle 2 within a runnable region, when the vehicle 1 approaches the target vehicle 2 as one of the surrounding vehicles. An offset amount in the target trajectory modification process can be set within such a range that the vehicle 1 does not exceed the runnable region. Incidentally, a region in, for example, the running lane is exemplified as "the runnable region" mentioned herein. In the following description, the trajectory offset through the target trajectory modification process will be referred to as "a vehicle avoidance trajectory". When the vehicle 1 runs along the vehicle avoidance trajectory and runs ahead of the target vehicle, the vehicle control apparatus gradually returns the target trajectory from the vehicle avoidance trajectory to the lane center trajectory.

According to this target trajectory modification process, when the vehicle 1 runs beside and past the target vehicle 2, the inter-vehicle distance from the target vehicle 2 in a vehicle width direction increases. Thus, a driver of the vehicle 1 feels less nervous when the vehicle 1 approaches the target vehicle 2 through automated driving.

Figure 2:
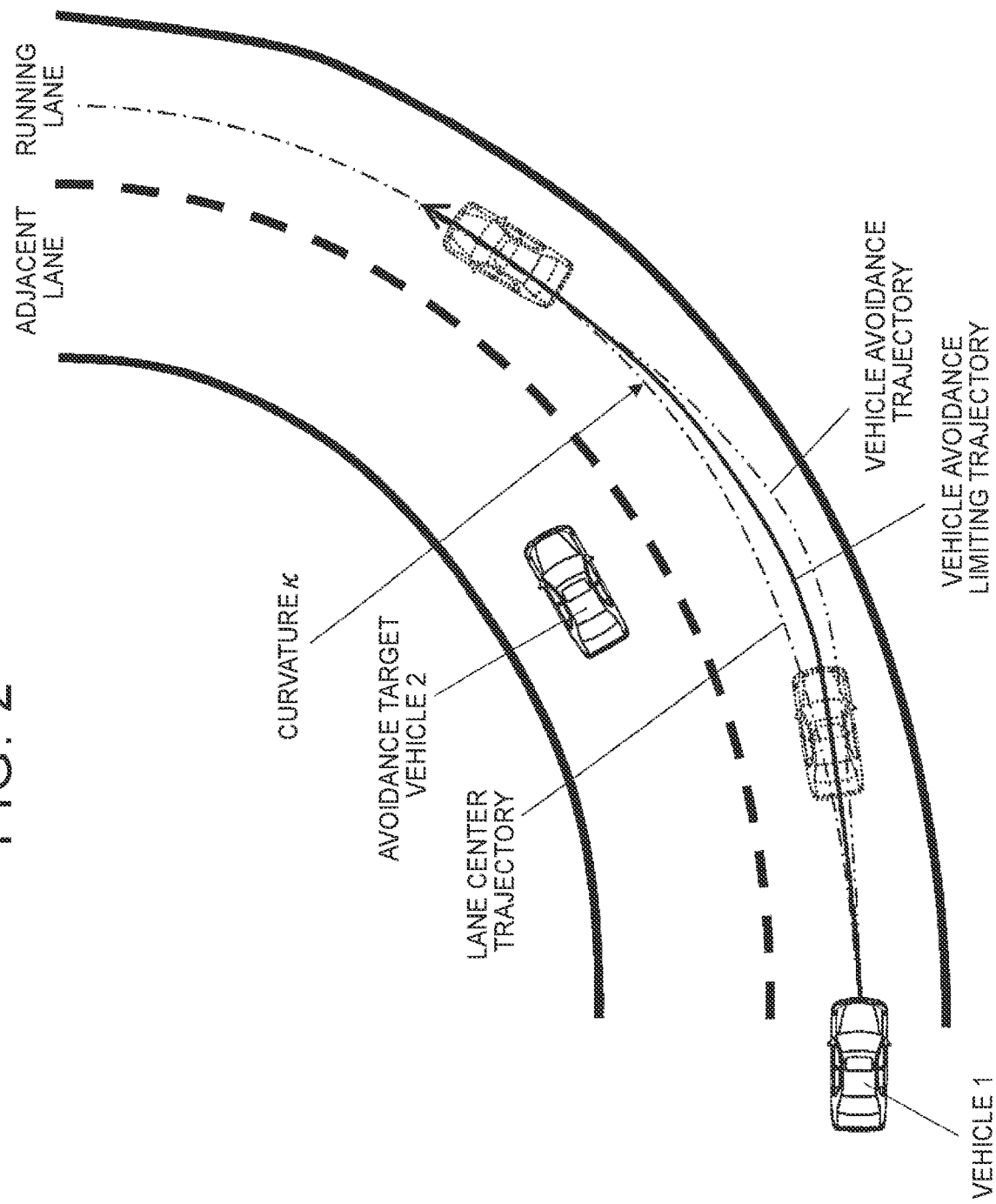
FIG. 2 is a conceptual view for illustrating a target trajectory modification process that is performed by the vehicle control apparatus for a vehicle that is automatically running on a curve.

It should be noted herein that the target trajectory may be modified to the vehicle avoidance trajectory that deviates toward an outer side of a curve with respect to the lane center trajectory when the vehicle 1 automatically running on the curve approaches the target vehicle 2 from the outer side of the curve. FIG. 2 is a conceptual view for illustrating the target trajectory modification process that is performed by the vehicle control apparatus for the vehicle automatically running on the curve. When the vehicle 1 runs along this vehicle avoidance trajectory, the driver may develop a psychological feeling of strangeness, namely, feel as if the vehicle 1 were unable to perfectly follow the curve and were deviating toward the outer side thereof through automated driving. This psychological feeling of strangeness intensifies as the curvature κ of the curve located ahead in a traveling direction of the vehicle 1 increases.

The vehicle control apparatus according to the present embodiment sets the offset amount in the target trajectory modification process in accordance with the curvature κ of the curve located ahead in the traveling direction of the vehicle 1, when the vehicle 1 approaches the target vehicle 2 on the curve from the outer side thereof. In concrete terms, the vehicle control apparatus sets the offset amount as a value that decreases as the curvature κ of the curve increases. In the following description, a trajectory whose offset amount is more limited than that of the vehicle avoidance trajectory will be referred to as "a vehicle avoidance limiting trajectory". According to this target trajectory modification process, the alleviation of the psychological feeling of strangeness caused by approaching the target vehicle 2 and the alleviation of the psychological feeling of strangeness caused by running along the trajectory deviating toward the outer side of the curve can be optimized in accordance with the curvature of the curve located ahead in the traveling direction of the vehicle 1. Thus, the possibility of making the driver of the vehicle develop a psychological feeling of strangeness in running on the curve through automated driving can be held low.

Incidentally, when the vehicle 1 approaches the target vehicle 2 on the curve from the outer side thereof, the likelihood of the driver of the vehicle 1 developing a feeling of strangeness, namely, feeling as if the vehicle 1 were coming into contact with the target vehicle 2 increases as a relative speed V of the vehicle 1 with respect to the target vehicle 2 rises. Thus, the vehicle control apparatus may set the offset amount in the target trajectory modification process in accordance with the relative speed V of the vehicle 1 with respect to the target vehicle 2. In concrete terms, the vehicle control apparatus sets the offset amount as a value that decreases as the relative speed V falls. According to this target trajectory modification process, the priority of the alleviation of a psychological feeling of strangeness caused by running along the trajectory deviating toward the outer side of the curve over the alleviation of a psychological feeling of strangeness caused by approaching the target vehicle 2 can be increased as the relative speed V falls. Thus, the possibility of making the driver of the vehicle develop a psychological feeling of strangeness in running on the curve through automated driving can be held much lower.

1-2. Configuration Example of Vehicle Control Apparatus

Figure 3:
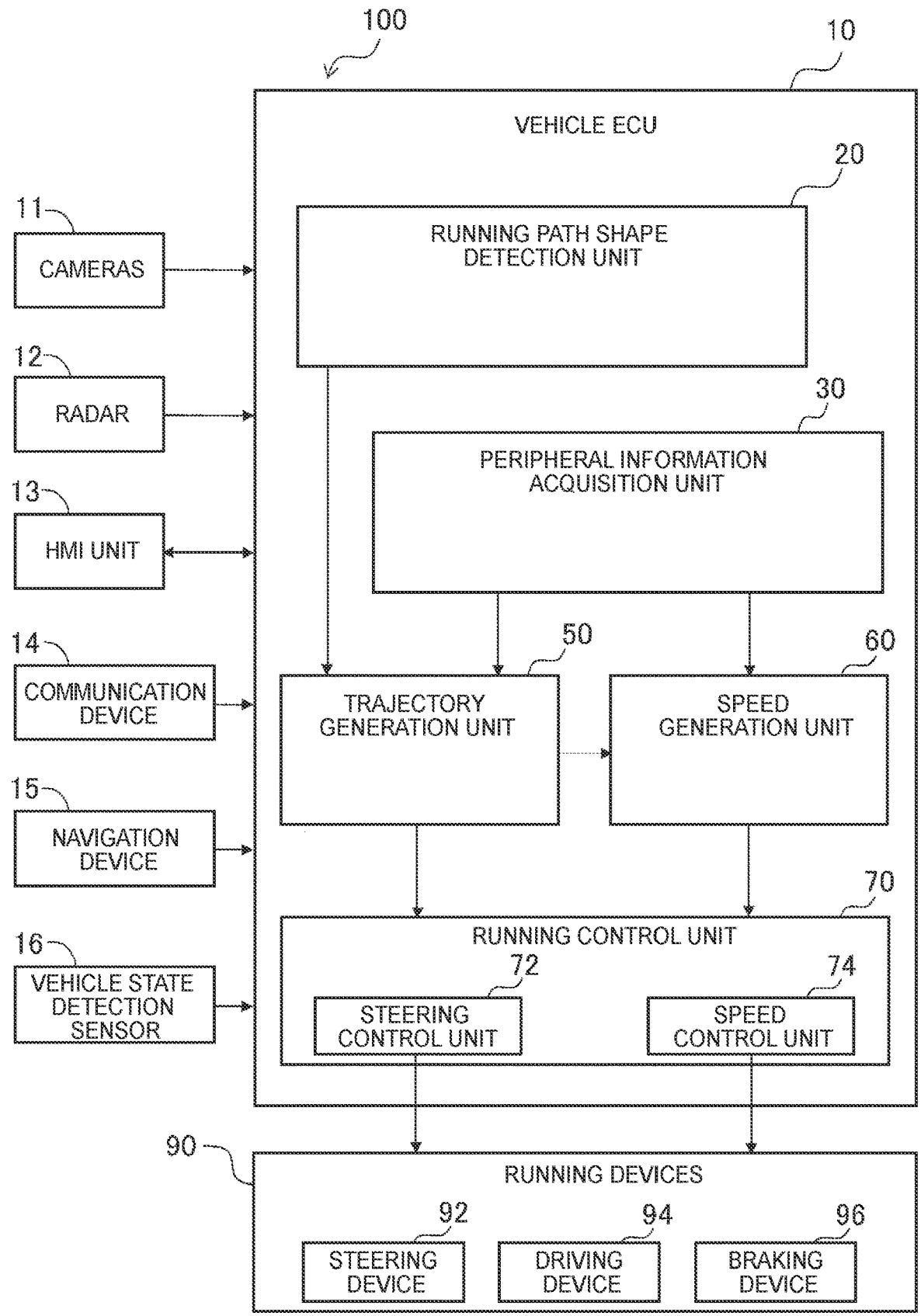
FIG. 3 is a view showing the general configuration of the vehicle control apparatus according to the first embodiment.

Next, a configuration example of the vehicle control apparatus that performs the above-mentioned lane change control will be described. FIG. 3 is a view showing the general configuration of the vehicle control apparatus according to the first embodiment. A vehicle control apparatus 100 shown in FIG. 3 is mounted in the vehicle 1, and performs automated driving control for controlling automated driving of the vehicle 1.

As shown in FIG. 3, the vehicle control apparatus 100 is configured to include a vehicle electronic control unit (ECU) 10 that is mounted in the vehicle 1. Besides, the vehicle control apparatus 100 is configured to include cameras 11, a radar 12, an HMI unit 13, a communication device 14, a navigation device 15, and a vehicle state detection sensor 16, which are connected to an input side of the vehicle ECU 10. Furthermore, the vehicle control apparatus 100 is configured to include a steering device 92, a driving device 94, and a braking, device 96, as running devices 90 that are connected to an output side of the vehicle ECU 10.

The cameras 11 function as information acquisition means for acquiring peripheral information on the vehicle 1, as is the case with, for example, a front camera that captures an image in front of the vehicle 1, and a rear-right camera and a rear-left camera that capture an image behind and on the right of the vehicle 1 and an image behind and on the left of the vehicle 1 respectively. The images captured by the cameras 11 are transmitted, as needed, to the vehicle ECU 10 as image data, and the vehicle ECU 10 subjects the respective image data to image processing. The peripheral information acquired by the cameras 11 includes, for example, information on positions of surrounding vehicles running around the vehicle 1, and road information such as information on white lines, information on traffic lights, and the like.

The radar 12 is, for example, a laser radar, a millimeter-wave radar, or the like, and functions as information acquisition means for acquiring peripheral information on the vehicle 1. The radar 12 sends out laser waves or the like forward and backward of the vehicle 1 respectively and acquires the peripheral information on the vehicle 1 by receiving reflected waves thereof. The peripheral information acquired by the radar 12 includes, for example, information on the presence/absence of surrounding vehicles, information on distances to, angles (i.e., relative positions) of, and speeds (i.e., relative speeds) of the surrounding vehicles, information on positions of utility poles, buildings and the like, etc. The respective pieces of information detected ley the radar 12 are transmitted, as needed, to the vehicle ECU 10.

The HMI unit 13 is an interface for providing the driver of the vehicle 1 with information and receiving information from the driver. For example, the HMI unit 13 is equipped with an input device, a display device, and a speaker. A touch panel, a keyboard, a switch, or a button is exemplified as the input device. The driver can input information on a destination and the like to the HMI unit 13 through the use of the input device. The respective pieces of information input from the driver are transmitted, as needed, to the vehicle ECU 10.

The communication device 14 functions as information acquisition means for receiving peripheral information from a road-side machine provided on a road via an antenna provided on the vehicle 1. The road-side machine is a beacon device that transmits, for example, traffic congestion information, traffic information on individual lanes, regulation information such as temporary stop and the like, information on traffic situations at blind spots, and the like. Besides, the communication device 14 also functions as information acquisition means for communicating with the surrounding vehicles around the vehicle 1 directly via the antenna or with the aid of a relay machine (not shown). For example, information on positions of the surrounding vehicles, information on speeds of the surrounding vehicles, and the like are exemplified as the peripheral information acquired herein. The respective pieces of information received by the communication device 14 are transmitted, as needed, to the vehicle ECU 10.

The navigation device 15 detects a current position of the vehicle 1 from a GPS satellite via the antenna, and carries out detection of a running speed of the vehicle, route guidance to a destination, and the like through the use of a GPS, a speed sensor, a gyroscope, and the like. Map data including detailed road information are contained in the navigation device 15. These map data include, for example, information on shapes of roads, the number of lanes, widths of the lanes, and the like. The information on the current position, the road information, and the like acquired by the navigation device 15 are transmitted, as needed, to the vehicle ECU 10.

The vehicle state detection sensor 16 detects a running state of the vehicle 1. A vehicle speed sensor, a lateral acceleration sensor, a yaw rate sensor, or the like is exemplified as the vehicle state detection sensor 16. The information detected by the vehicle state detection sensor 16 is transmitted to the vehicle ECU 10.

The steering device 92 is constituted of a steering wheel and a steering actuator, and automatically controls a steering angle regardless of steering operation performed by the driver. The steering wheel is a general steering device that changes the directions of wheels in accordance with the steering operation performed by the driver. The steering actuator changes the directions of the wheels as automatic steering, based on, a command from a steering control unit 72 that will be described later, independently of the steering operation performed by the driver.

The driving device 94 is a driving, source of the vehicle 1. For example, an engine is exemplified as the driving device 94. A driving force generated by the driving device 94 is transmitted to the driving wheels via a motive power transmission path (not shown). A speed control unit 74 that will be described later controls the amount of fuel injection, the timing of fuel injection, the opening degree of a throttle, and the like in the engine as the driving device 94. Thus, the driving force of the vehicle 1 is controlled.

The braking device 96 is constituted of a brake device and a brake actuator, and automatically applies a braking force to each of the wheels independently of braking operation performed by the driver. The brake device is a general brake device such as a full air-type drum brake or the like, which generates a braking force (a brake force) in each of the front and rear wheels with the aid of an air pressure, in accordance with depression operation of a brake pedal performed by the driver. The brake actuator generates a braking force of an arbitrary magnitude in each of the wheels as an automatic brake, based on a command from a speed control unit 80 that will be described later, independently of the braking operation performed by the driver.

1-3. Description of Functions of Vehicle ECU

The vehicle control apparatus 100 performs automated driving control for controlling automated driving of the vehicle 1. The vehicle control apparatus 100 is configured to include the vehicle ECU 10. The vehicle ECU 10 is a microcomputer that is equipped with input/output interfaces, a memory, and a processor. The vehicle ECU 10 receives information from the cameras 11, the radar 12, the HMI unit 13, the communication device 14, the navigation device 15, and the vehicle state detection sensor 16, and performs automated driving control based on the received information. In concrete terms, the vehicle ECU 10 draws out a running plan of the vehicle 1, and controls the running devices 90 such that the vehicle 1 runs according to the running plan.

In automated driving control performed by the vehicle ECU 10, a target trajectory and a target speed of the vehicle 1 are generated according to the running plan, and the vehicle 1 is caused to automatically run in accordance with the target trajectory and the target speed. In this case, the vehicle ECU 10 performs a target trajectory modification process for modifying the target trajectory in such a manner as to keep the vehicle 1 from approaching the target vehicle 2. The vehicle ECU 10 has a running path shape detection unit 20, a peripheral information acquisition unit 30, a trajectory generation unit 50, a speed generation unit 60, and a running control unit 70, as functional blocks for realizing the above-mentioned automated driving control and the target trajectory modification process associated therewith.

The running path shape detection unit 20 is a functional block that draws out a lane plan as a plan of a running path of the vehicle 1, and that acquires lane information on the running path according to the plan thus drawn out. In concrete terms, the running path shape detection unit 20 draws out the lane plan as the plan of the running path of the vehicle 1, based on destination information transmitted from the HMI unit 13 and map information transmitted from the navigation device 15. Besides, the running path shape detection unit 20 acquires lane information including the presence/absence of a curve on the running path located ahead in the traveling direction of the vehicle 1 and a curvature κ of the curve, based on the lane plan thus drawn out, the peripheral information acquired by the cameras 11, and an own position transmitted from the navigation device 15. The acquired lane plan and the acquired lane information are transmitted to the trajectory generation unit 50.

The peripheral information acquisition unit 30 is a functional block for recognizing a state of the target vehicle 2 that is to be overtaken by the vehicle 1, that is to run side by side with the vehicle 1, or that is to pass the vehicle 1, among the surrounding vehicles that run around the vehicle 1. In concrete terms, the peripheral information acquisition unit 30 acquires target vehicle information from the cameras 11, the radar 12, the communication device 14, and the navigation device 15 as information acquisition means. The target vehicle information mentioned herein includes, for example, the presence/absence of the target vehicle 2, the position thereof, and the vehicle speed thereof.

Besides, the peripheral information acquisition unit 30 recognizes a relative distance L between the recognized target vehicle 2 and the vehicle 1, and the relative speed V thereof, based on the information on the recognized target vehicle and a current vehicle speed of the vehicle 1 that is transmitted from the vehicle state detection sensor 16. The information on the recognized target vehicle, the relative distance L, and the relative speed V are transmitted to the trajectory generation unit 50 and the speed generation unit 60.

The trajectory generation unit 50 generates the target trajectory of the vehicle 1 based on the information transmitted from the running path shape detection unit 20 and the peripheral information acquisition unit 30. The trajectory generation unit 50 generates the target trajectory for causing the vehicle 1 to run according to the lane plan transmitted from the running path shape detection unit 20. For example, the trajectory generation unit 50 sets, as the target trajectory, a lane center trajectory obtained by tracing the center of the running lane in the width direction thereof according to the lane plan. Incidentally, the target trajectory set herein should not necessarily be the lane center trajectory. That is, for example, a lane IN-side trajectory that is located inside the lane center trajectory may be set as the target trajectory on the curve.

Figure 4:
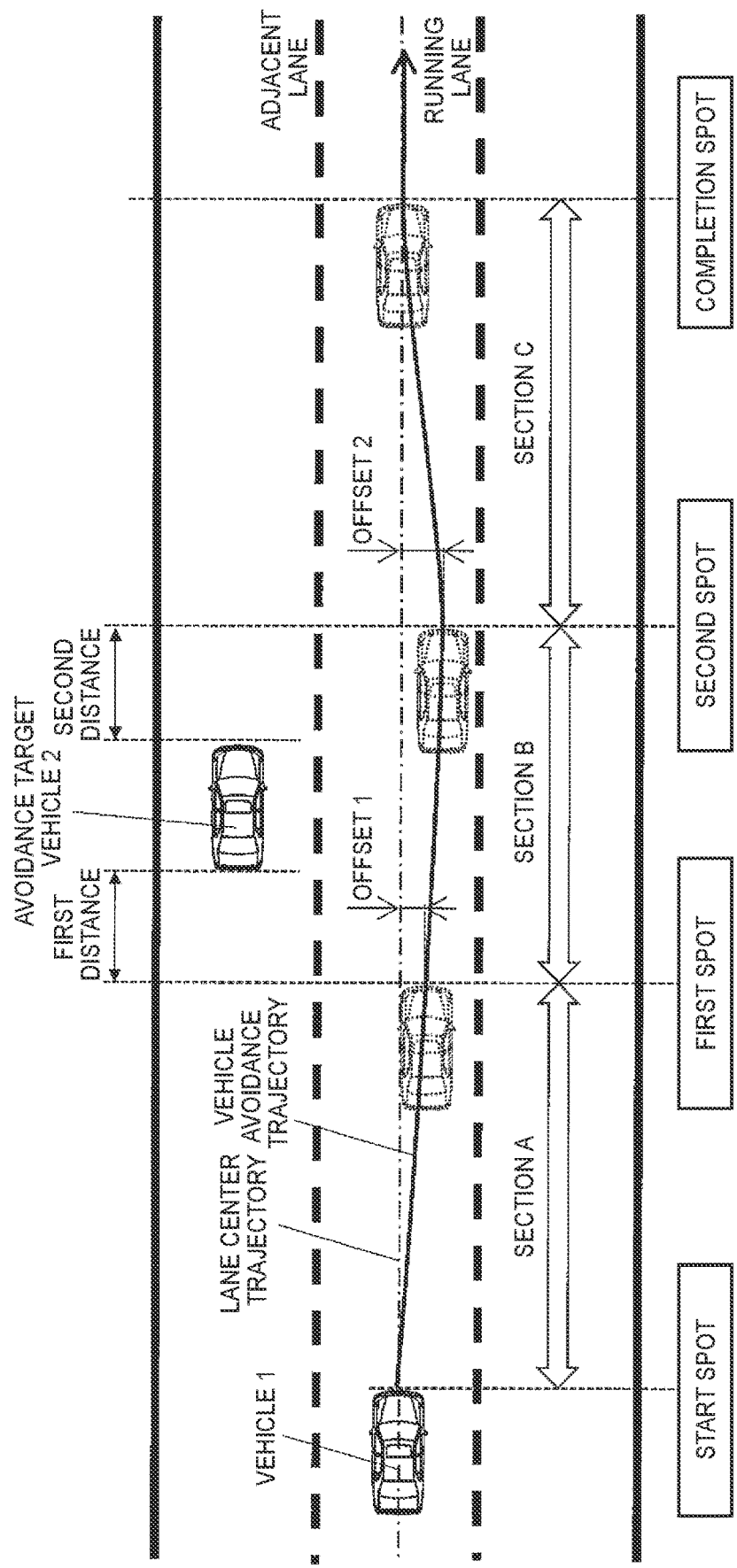
FIG. 4 is a view for illustrating an example of the target trajectory modification process that is performed by the vehicle control apparatus according to the first embodiment.

Besides, the trajectory generation unit 50 performs the target trajectory modification process for offsetting the target trajectory in such a manner as to move away from the target vehicle 2 within the runnable region, when the vehicle 1 approaches the target vehicle 2. FIG. 4 is a view for illustrating an example of the target trajectory modification process that is performed by the vehicle control apparatus 100 according to the first embodiment. The example shown in this drawing indicates a case where the vehicle 1 approaches the target vehicle when the running lane is constituted of a straight line, as a basic operation of the target trajectory modification process.

In the example shown in this drawing, the trajectory generation unit 50 specifies a first spot at which the inter-vehicle distance to the target vehicle 2 is equal to a predetermined first distance, when the vehicle 1 approaches the target vehicle 2. The first distance mentioned herein is, for example, a distance at which a predetermined predicted time to collision (TTC) with the target vehicle 2, which is obtained from the relative speed V, is equal to a predetermined predicted time TTC1 to collision. The trajectory generation unit 50 generates aa vehicle avoidance trajectory such that the offset amount at the first spot becomes equal to a predetermined normal avoidance offset amount, and adopts this vehicle avoidance trajectory as a target trajectory of the vehicle 1 in a section A from a start spot to the first spot. Incidentally, the normal avoidance offset amount mentioned herein can be arbitrarily set within such a range that the vehicle 1 is confined within the runnable region.

The trajectory generation unit 50 specifies a second spot located ahead of the target vehicle 2 by a second distance, as an end spot of a section that starts from the first spot and in which the vehicle 1 runs side by side with the target vehicle 2. Then, the trajectory generation unit 50 generates a vehicle avoidance trajectory such that the offset amount at the second spot becomes equal to or larger than the normal avoidance offset amount, and adopts this vehicle avoidance trajectory as a target trajectory of the vehicle 1 in a section B from the first spot to the second spot.

The trajectory generation unit 50 specifies a third spot located ahead of the second spot by a predetermined distance, as a completion spot of the target trajectory modification process. The predetermined distance mentioned herein can be arbitrarily set within such a range that the behavior of the vehicle 1 does not become abrupt. Then, the trajectory generation unit 50 generates a vehicle avoidance trajectory such that the offset amount at the third spot becomes equal to zero, and adopts this vehicle avoidance trajectory as a target trajectory of the vehicle 1 in a section C from the second spot to the third spot.

According to this target trajectory modification process, when the vehicle 1 approaches the target vehicle 2, the target trajectory can be modified in such a direction, as to move away from the target vehicle 2.

Figure 5:
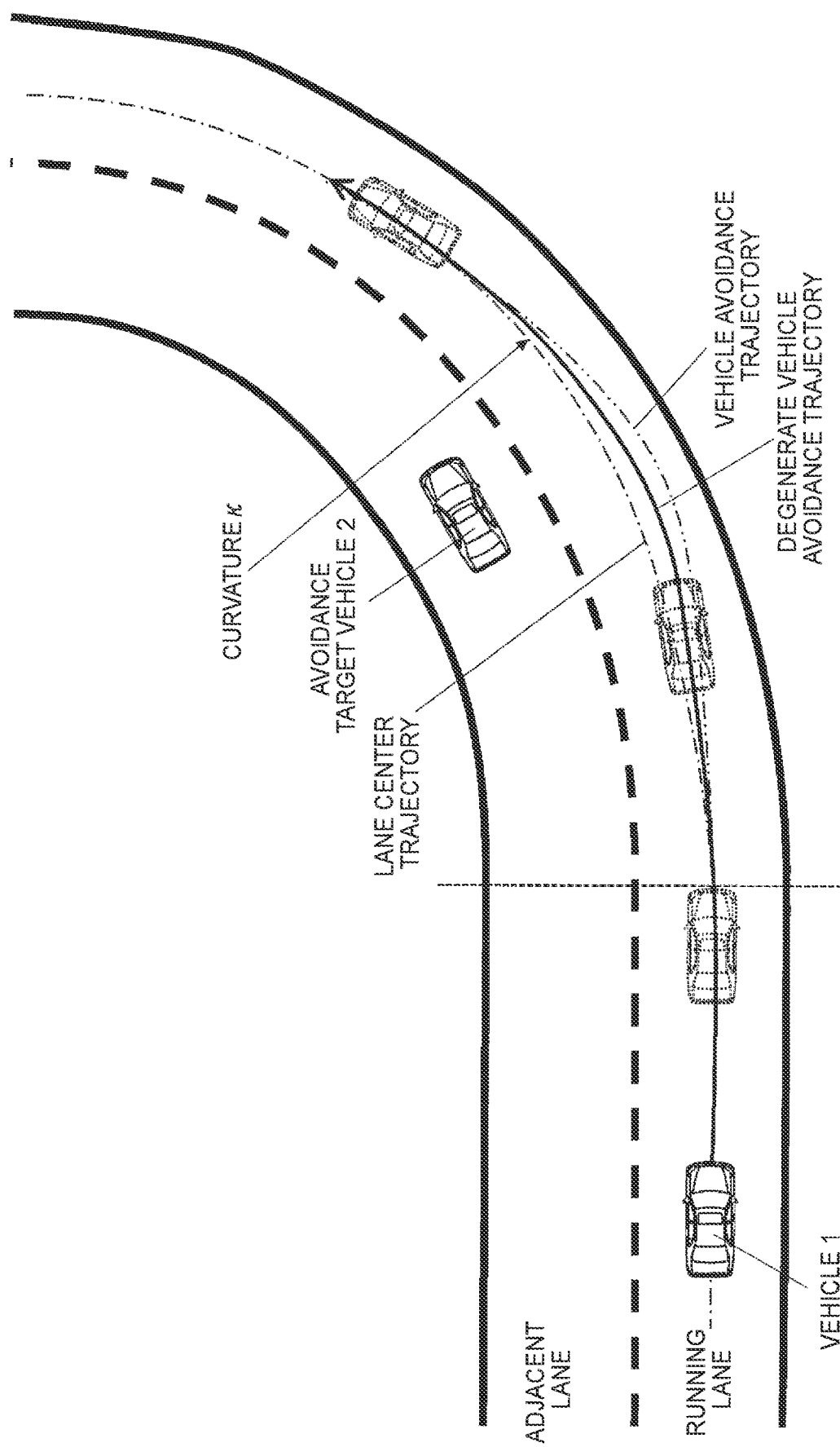
FIG. 5 is a view for illustrating another example of the target trajectory modification process that is performed by the vehicle control apparatus according to the first embodiment.

FIG. 5 is a view for illustrating another example of the target trajectory modification process that is performed by the vehicle control apparatus according to the first embodiment. The example shown in this drawing indicates a case where the vehicle 1 approaches the target vehicle from an outer side of a curve, when the running lane is constituted of the curve, as a characteristic operation of the target trajectory modification process.

Figure 6:
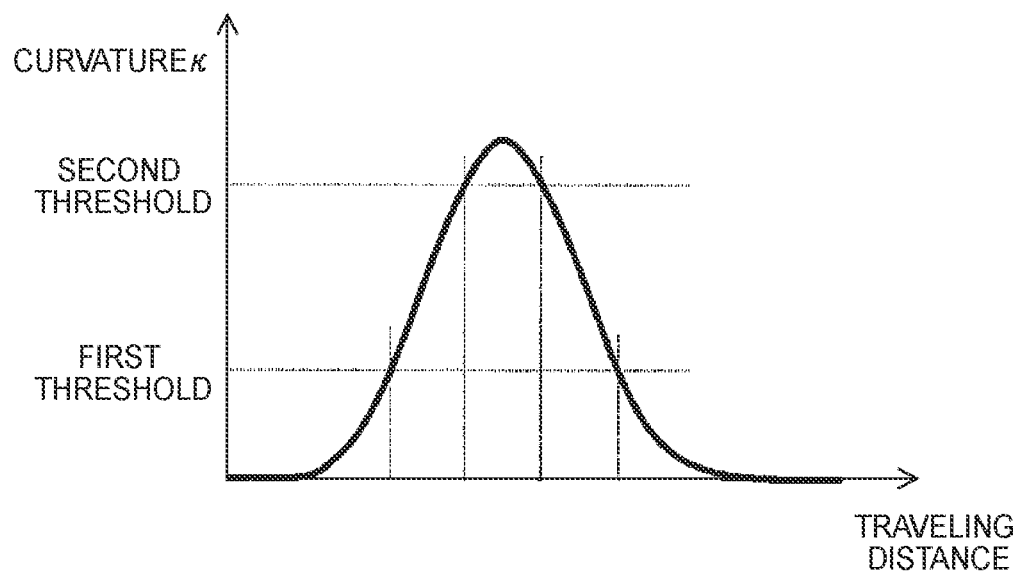
FIG. 6 is a view showing a curvature κ of a curve with respect to a traveling distance of the vehicle.
Figure 7:
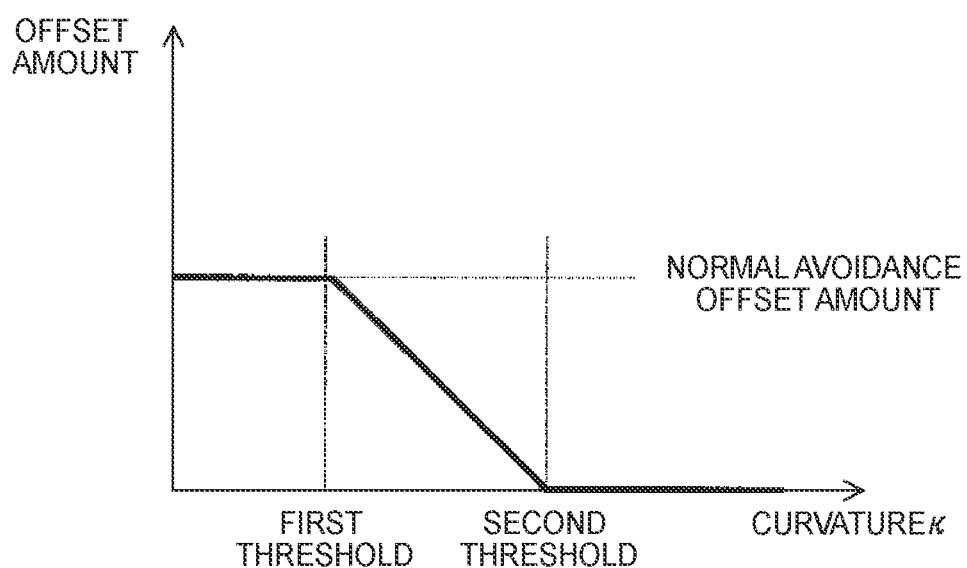
FIG. 7 is a view showing an exemplary map that associates an offset amount with the curvature κ of the curve.

In the example shown in this drawing, the trajectory generation unit 50 sets the offset amount in accordance with the curvature κ of the curve that is transmitted from the running path shape detection unit 20, when the vehicle 1 approaches the target vehicle 2 from the outer side of the curve. FIG. 6 is a view showing the curvature κ of the curve with respect to the traveling distance of the vehicle. FIG. 7 is a view showing an exemplary map that associates the offset amount with the curvature κ of the curve. When the running path shape detection unit 20 acquires the curvature κ of the curve shown in FIG. 6, the trajectory generation unit 50 can calculate the offset amount from, for example, the map shown in FIG. 7. In this map, the offset amount is set equal to the normal avoidance offset amount within a range of the traveling distance where the curvature κ of the curve is smaller than a first threshold, and the offset amount is set equal to zero within a range of the traveling distance where the curvature κ of the curve is larger than a second threshold. Besides, in this map, the offset amount is set in such a manner as to decrease as the curvature κ of the curve increases, when the curvature κ of the curve is between the first threshold and the second threshold. Thus, the offset amount changes in such a manner as to decrease in a monotonous non-increasing manner as the curvature κ of the curve increases. Incidentally, the offset amount should not necessarily be calculated through the use of the map shown in FIG. 7. That is, it is also appropriate to adopt a configuration in which another map prescribing a tendency according to which the offset amount decreases in a monotonous non-increasing manner as the curvature κ of the curve increases is used. Besides, the first threshold and the second threshold can be set equal to arbitrary values corresponding to the vehicle width of the vehicle 1, the lane width of the running lane, and the like.

According to this target trajectory modification process, the alleviation of a psychological feeling of strangeness caused by approaching the target vehicle 2 and the alleviation of a psychological feeling of strangeness caused by running along a trajectory deviating toward the outer side of the curve can be optimized in accordance with the curvature of the curve.

The speed generation unit 60 generates a target speed of the vehicle 1 based on the information transmitted from the trajectory generation unit 50 and the peripheral information acquisition unit 30. For example, the speed generation unit 60 generates a target speed for realizing the target trajectory transmitted from the trajectory generation unit 50, while ensuring a safety margin from the surrounding vehicles recognized by the peripheral information acquisition unit 30.

The running control unit 70 is a functional block for determining operation amounts of the running devices 90 of the vehicle 1 in accordance with a target driving force and the target speed. In concrete terms, the running control unit 70 is configured to include the steering control unit 72 and the speed control unit 74. The steering control unit 72 determines an operation amount of the steering device 92 for realizing the target trajectory. Besides, the speed control unit 74 determines operation amounts of the driving device 94 and the braking device 96 for realizing the target speed.

1-4. Concrete Process as Target Trajectory Modification Process

Figure 8:
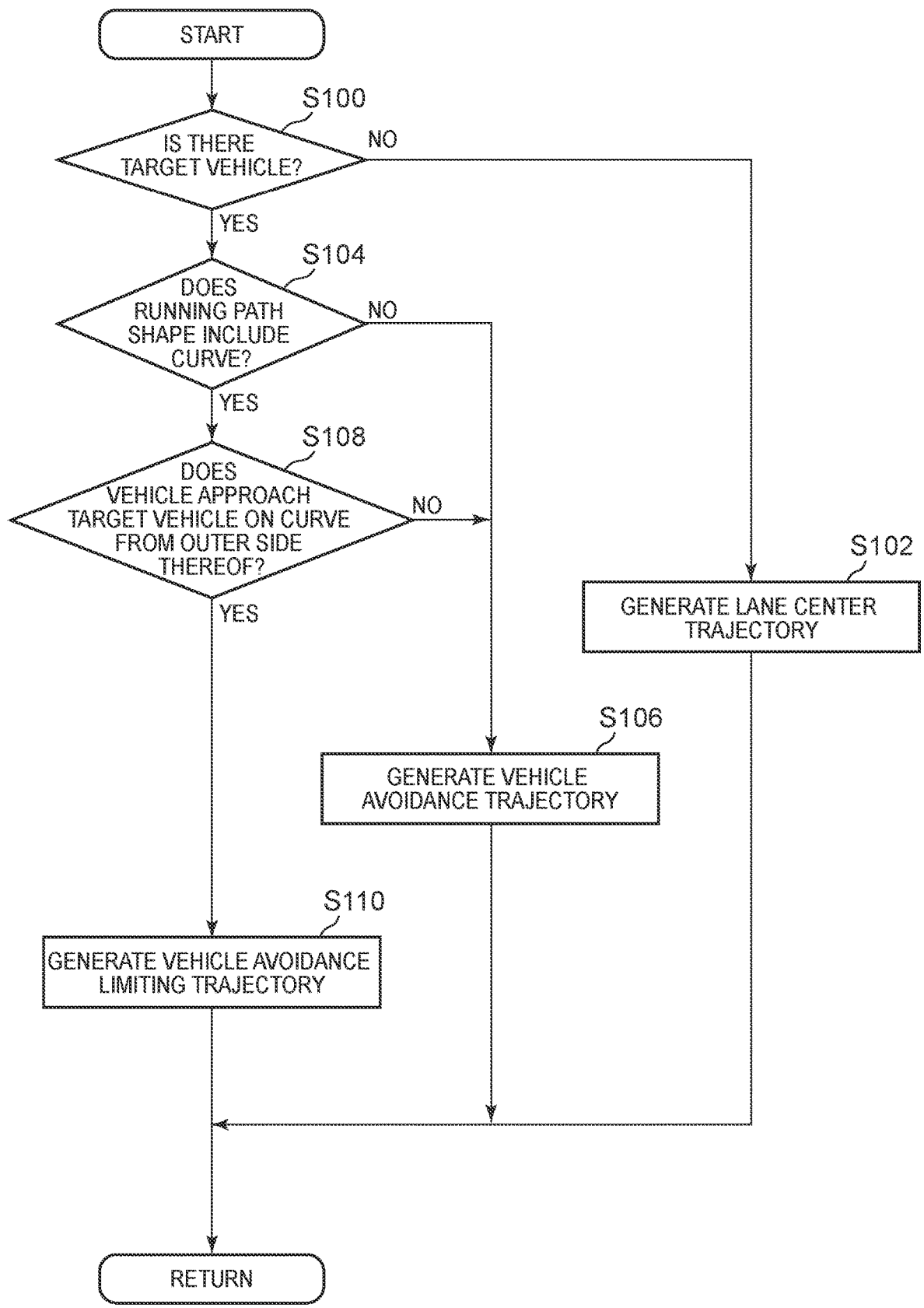
FIG. 8 is a flowchart showing a routine of the target trajectory modification process that is performed in the first embodiment.

Next, a concrete process as the target trajectory modification process, that is performed by the vehicle control apparatus 100 according to the first embodiment configured as described above will be described with reference to a flowchart. FIG. 8 is a flowchart showing a routine of the target trajectory modification process that is performed in the first embodiment. Incidentally, the routine shown in FIG. 8 is repeatedly executed on a predetermined control cycle (e.g., 0.1 seconds) by the vehicle ECU 10 during automated driving of the vehicle 1.

When the routine shown in FIG. 8 is started, the trajectory generation unit 50 of the vehicle ECU 10 first determines, from the information on surrounding vehicles transmitted from the peripheral information acquisition unit 30, whether or not the target vehicle 2 exists (step S100). If it is determined as a result that the target vehicle 2 does not exist, the trajectory generation unit 50 generates a lane center trajectory as a target trajectory (step S102).

On the other hand, if it is determined in step S100 that the target vehicle 2 exists, the trajectory generation unit 50 subsequently determines whether or not a running path shape that is transmitted from the running path shape detection unit 20 includes a curve (step S104). If it is determined as a result that the running path shape includes no curve, the trajectory generation unit 50 generates a vehicle avoidance trajectory as the target trajectory (step S106). In this case, the trajectory generation unit 50 generates the vehicle avoidance trajectory through the use of a normal avoidance offset amount.

On the other hand, if it is determined in the processing of step S104 that the running path shape includes a curve, the trajectory generation unit 50 determines whether or not the vehicle 1 approaches the target vehicle 2 on the curve from the outer side thereof, based on the relative distance L and the relative speed V that are transmitted from the peripheral information acquisition unit 30, and the own position and the map information that are transmitted from the navigation device 15 (step S108). If the result of the determination is recognized to be negative, a transition to the processing of step S106 is made. On the other hand, if the result of the determination is recognized to be affirmative in the processing of step S108, the trajectory generation unit 50 generates a vehicle avoidance limiting trajectory as the target trajectory (step S110). In this case, the trajectory generation unit 50 generates the vehicle avoidance limiting trajectory whose offset amount is made smaller than the normal avoidance offset amount in accordance with the curvature of the curve, based on the information on the target vehicle 2 transmitted from the peripheral information acquisition unit 30 and the curvature of the curve transmitted from the running path shape detection unit 20.

According to this target trajectory modification process, the offset amount of the vehicle avoidance limiting trajectory is set in accordance with the curvature of the curve, so the possibility of completing a change in lane through automated driving can be enhanced.

By the way, in the above-mentioned vehicle control apparatus 100 according to the first embodiment, the running path, shape detection unit 20 of the vehicle ECU 10 is equivalent to "the lane information acquisition unit" of the first disclosure, and the peripheral information acquisition unit 30 is equivalent to "the target vehicle information acquisition unit" of the first disclosure.

2. Second Embodiment

Next, a vehicle control apparatus according to the second embodiment will be described.

2-1. Configuration Vehicle Control Apparatus According to Second Embodiment The vehicle control apparatus according to the second embodiment is identical in configuration to the vehicle control apparatus 100 according to the first embodiment shown in FIG. 3. In consequence, the detailed description of the vehicle control apparatus according to the second embodiment will be omitted.

2-2. Characteristic Functions of Vehicle Control Apparatus According to Second Embodiment In the above-mentioned vehicle control apparatus 100 according to the first embodiment, the offset amount in the target trajectory modification process is set as a value corresponding to the curvature s of the curve. It should be noted herein that the likelihood of the driver developing a feeling of strangeness, namely, feeling as if the vehicle 1 were coming into contact with the target vehicle 2 increases as the relative speed V of the vehicle 1 with respect to the target vehicle 2 rises when the vehicle 1 approaches the target vehicle 2 on the curve from the outer side thereof. Thus, the vehicle control apparatus 100 according to the second embodiment is characterized by an operation of setting the offset amount in the target trajectory modification process in accordance with the relative speed V. In concrete terms, the peripheral information acquisition unit 30 functions as a relative speed detection unit that detects the relative speed V. The trajectory generation unit 50 sets the offset amount as a value that decreases as the detected relative speed V falls. According to this target trajectory modification process, the priority of the alleviation of a psychological feeling of strangeness caused by running along a trajectory deviating toward the outer side of the curve over the alleviation of a psychological feeling of strangeness caused by approaching the target vehicle 2 can be increased as the relative speed V falls. Thus, the possibility of making the driver of the vehicle develop a psychological feeling of strangeness can be held much lower when the vehicle runs on the curve through automated driving.

3. Third Embodiment

Next, a vehicle control apparatus according to the third embodiment will be described.

3-1. Configuration of Vehicle Control Apparatus According to Third Embodiment The vehicle control apparatus according to the third embodiment is identical in configuration to the vehicle control apparatus 100 according to the first embodiment shown in FIG. 3. In consequence, the detailed description of the vehicle control apparatus according to the third embodiment will be omitted.

3-2. Characteristic Functions of Vehicle Control Apparatus According to Third Embodiment In automated driving control that is performed by the vehicle control apparatus according to the third embodiment, the following speed control is performed in addition to the target trajectory modification process that is performed by the vehicle control apparatus 100 according to the first embodiment or the second embodiment. The speed generation unit 60 generates a target speed such that the relative speed V becomes low, when the vehicle 1 approaches the target vehicle 2 from the outer side of the curve. In the following description, the target speed that is generated when the vehicle 1 approaches the target vehicle 2 from the outer side of the curve will be referred to as "a relative speed reducing speed", and the target speed that is generated otherwise will be referred to as "a normal speed".

There is no limit to the method of calculating the relative speed reducing speed as long as the relative speed reducing speed is generated to be lower than the normal speed. For example, the speed generation unit 60 adopts, as the relative speed reducing speed, a speed obtained by subtracting a predetermined ratio of the normal speed therefrom. Besides, the speed generation unit 60 may generate the target speed of the vehicle 1 such that the relative speed V changes in accordance with the curvature of the curve transmitted from the running path shape detection unit 20. In concrete terms, the speed generation unit 60 may generate the target speed such that the relative speed V falls as the curvature of the curve increases.

The likelihood of the driver developing a psychological feeling of strangeness caused by approaching the target vehicle 2 increases as the relative speed V rises. According to this operation, the psychological feeling of strangeness caused by approaching the target vehicle 2 can be alleviated from the standpoint of the relative speed V, so the psychological feeling of strangeness caused by running along a trajectory deviating toward the outer side of the curve can be alleviated by reducing the offset amount correspondingly. Thus, the possibility of making the driver of the vehicle develop a psychological feeling of strangeness can be held low when the vehicle runs on the curve through automated driving.

Figure 9:
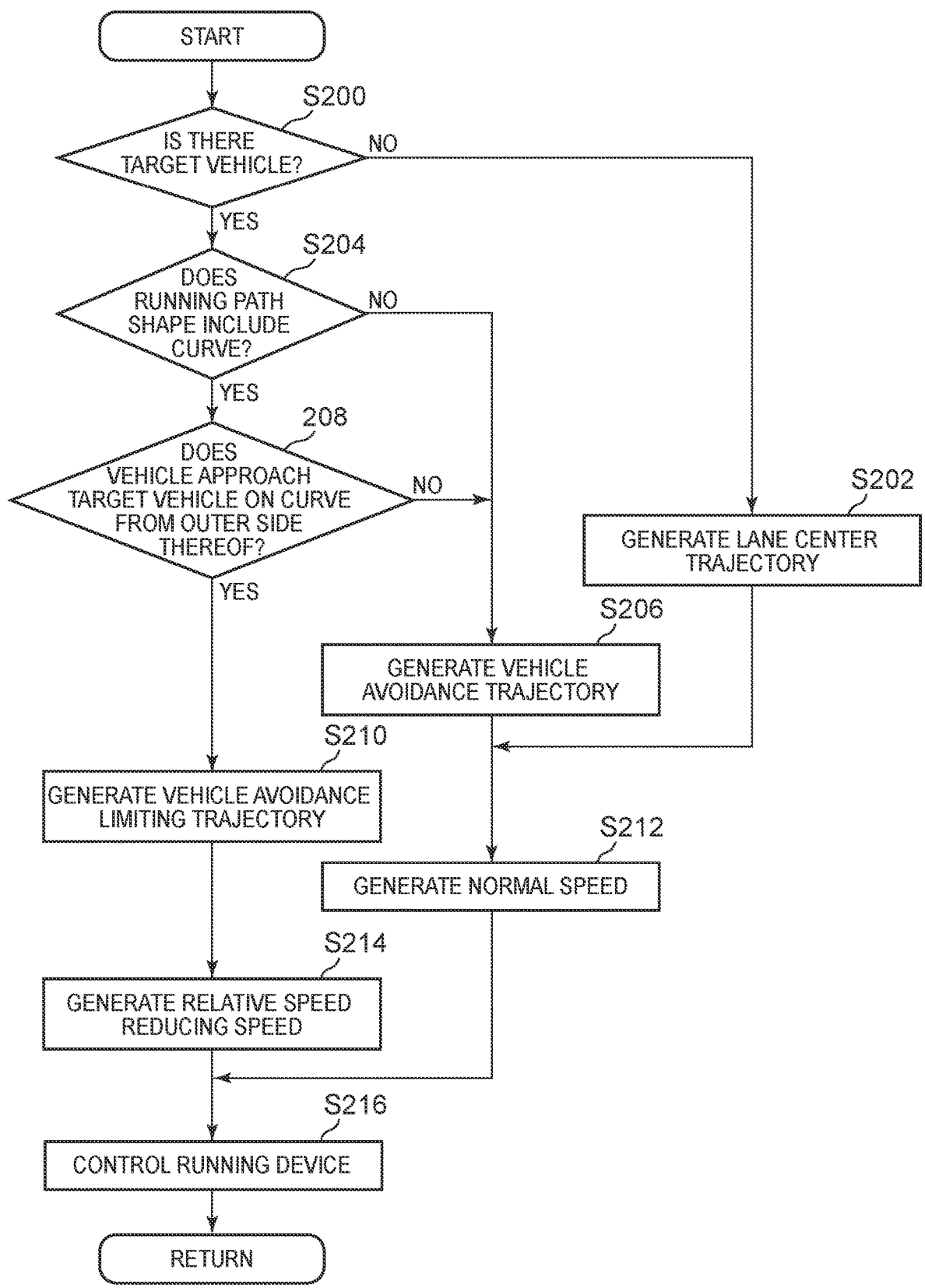
FIG. 9 is a flowchart showing a routine of automated driving control that is performed in the third embodiment.

3-3. Concrete Process of Automated Driving Control Performed by Vehicle Control Apparatus According to Third Embodiment Next, a concrete process of automated driving control that is performed by the vehicle control apparatus 100 according to the third embodiment configured as described above will be described with reference to a flowchart. FIG. 9 is a flowchart showing a routine of automated driving control that is performed in the third embodiment. Incidentally, the routine shown in FIG. 9 is repeatedly executed on a predetermined control cycle (e.g., 0.1 seconds) by the vehicle ECU 10 during automated driving of the vehicle 1.

The processing of steps S200 to S210 of the routine shown in FIG. 9 is performed in the same manner as the target trajectory modification process in steps S100 to S110 of the routine shown in FIG. 8. When the processing of step S202 or S206 is performed, the speed generation unit 60 of the vehicle ECU 10 subsequently generates a normal speed as a target speed (step S212). In this case, concretely, the speed generation unit 60 generates, as the normal speed, a speed for realizing the target trajectory transmitted from the trajectory generation unit 50 while ensuring a safety margin from the surrounding vehicles recognized by the peripheral information acquisition unit 30.

On the other hand, when the processing of step S210 is performed, the speed generation unit 60 of the vehicle ECU 10 generates a relative speed reducing speed as the target speed (step S214). In this case, concretely, for example, the speed generation unit 60 generates, as the relative speed reducing speed, a speed obtained by subtracting a predetermined ratio of the normal speed therefrom.

When the processing of step S212 or S214 is performed, the running control unit 70 of the vehicle ECU 10 determines operation amounts of the running devices 90 of the vehicle 1 in accordance with the target trajectory and the target speed. In this case, concretely, the steering control unit 72 of the running control unit 70 determines an operation amount of the steering device 92 for realizing the target trajectory. Besides, the speed control unit 74 of the running control unit 70 determines operation amounts of the driving device 94 and the braking device 96 for realizing the target speed.

According to this control, when the vehicle 1 approaches the target vehicle 2 from the outer side of the curve, the speed of the vehicle 1 is controlled such that the relative speed V becomes low. Therefore, the possibility of making the driver of the vehicle develop a psychological feeling of strangeness can be held low.

In an aspect of the disclosure, the at least one electronic control unit may be configured to set the offset amount of the target trajectory such that the offset amount of the target trajectory decreases as the curvature of the curve increases, when the vehicle approaches the target vehicle from the outer side of the curve, in the target trajectory modification process.

In an aspect of the disclosure, the at least one electronic control unit may be configured to detect a relative speed of the vehicle with respect to the target vehicle, and set the offset amount such that the offset amount decreases as the relative speed fails, in the target trajectory modification process.

In an aspect of the disclosure, the at least one electronic control unit may be configured to detect a relative speed of the vehicle with respect to the target vehicle, and set the offset amount such that the offset amount decreases as the relative speed falls, in the target trajectory modification process.

In an aspect of the disclosure, the at least one electronic control unit may be configured to generate a target speed for causing the vehicle to automatically run within the runnable region, cause the vehicle to automatically run in accordance with the target speed, and generate the target speed such that the relative speed falls when the vehicle approaches the target vehicle from the outer side of the curve.

In an aspect of the disclosure, the at least one electronic control unit may be configured to generate a target speed for causing the vehicle to automatically run within the runnable region, cause the vehicle to automatically run in accordance with the target speed, and generate the target speed such that the relative speed falls when the vehicle approaches the target vehicle from the outer side of the curve.

In an aspect of the disclosure, the at least one electronic control unit may be configured to modify the target trajectory such that a first offset amount at a first spot where a distance to the target vehicle is equal to a first distance becomes equal to a predetermined normal avoidance offset amount, in the target trajectory modification process.

In an aspect of the disclosure, the first distance may be a distance at which a predicted time to collision of the vehicle with the target vehicle is equal to a predetermined predicted time to collision.

In an aspect of the disclosure, the at least one electronic control unit may be configured to modify the target trajectory such that a second offset amount at a second spot that is located ahead of the first spot becomes equal to an offset amount that is equal to or larger than the predetermined normal avoidance offset amount, in the target trajectory modification process.

Besides, in the target trajectory modification process according to the aspect of this disclosure, the offset amount of the target trajectory may be set in such a manner as to decrease as the curvature of the curve increases. With this configuration, the offset amount is set in such a manner as to decrease as the curvature of the curve increases, and therefore, the offset amount can be set in such a manner as to decrease as the psychological feeling of strangeness intensifies when the vehicle runs along a trajectory deviating toward the outer side of the curve.

The likelihood of developing a feeling of strangeness, namely, feeling as if the vehicle were coming into contact with the target vehicle increases as the relative speed with respect to the target vehicle rises. According to the aspect of this disclosure, the amount by which the target trajectory is offset may be changed in accordance with the relative speed. With this configuration, both the feeling of strangeness developed as if the own vehicle were deviating toward the outer side of the curve through automated driving, and the feeling of strangeness developed as if the own vehicle were coming into contact with the target vehicle can be alleviated.

Besides, according to the aspect of this disclosure, the relative speed with respect to the target vehicle may be made low when the vehicle approaches the target vehicle from the outer side of the curve. With this configuration, the feeling of strangeness developed as if the vehicle were coming into contact with the target vehicle can be alleviated.

What is claimed is:

1. A vehicle control apparatus that is mounted in a vehicle, comprising at least one electronic control unit configured to:
   acquire lane information including a curvature of a curve located ahead in a traveling direction of the vehicle;
   acquire target vehicle information as information on a target vehicle that is to be overtaken by the vehicle, that is to run side by side with the vehicle, or that is to pass the vehicle;
   generate, based on the lane information and the target vehicle information, a target trajectory for causing the vehicle to automatically run within a runnable region;
   perform a target trajectory modification process for offsetting the target trajectory determined from the lane information in such a direction as to move away from the target vehicle, when the vehicle approaches the target vehicle, thereby defining a vehicle avoidance trajectory;
   set an offset amount of the target trajectory in accordance with the curvature of the curve, when the vehicle approaches the target vehicle from an outer side of the curve, in the target trajectory modification process, wherein the offset amount of the trajectory decreases as the curvature of the curve increases, thereby defining a vehicle avoidance limiting trajectory, wherein an offset amount of the vehicle avoidance limiting trajectory from the target trajectory is less than an offset amount of the vehicle avoidance trajectory from the target trajectory; and
   cause the vehicle to automatically run along the target trajectory modified through the target trajectory modification process.

2. The vehicle control apparatus according to claim 1, wherein
   the at least one electronic control unit is configured to
      detect a relative speed of the vehicle with respect to the target vehicle, and
      set the offset amount such that the offset amount decreases as the relative speed falls, in the target trajectory modification process.

3. The vehicle control apparatus according to claim 1, wherein
   the at least one electronic control unit is configured to
      detect a relative speed of the vehicle with respect to the target vehicle, and
      set the offset amount such that the offset amount decreases as the relative speed falls, in the target trajectory modification process.

4. The vehicle control apparatus according to claim 2, wherein
   the at least one electronic control unit is configured to
      generate a target speed for causing the vehicle to automatically run within the runnable region,
      cause the vehicle to automatically run in accordance with the target speed, and generate the target speed such that the relative speed falls when the vehicle approaches the target vehicle from the outer side of the curve.

5. The vehicle control apparatus according to claim 3, wherein the at least one electronic control unit is configured to generate a target speed for causing the vehicle to automatically run within the runnable region, cause the vehicle to automatically run in accordance with the target speed, and generate the target speed such that the relative speed falls when the vehicle approaches the target vehicle from the outer side of the curve.

6. The vehicle control apparatus according to claim 1, wherein the at least one electronic control unit is configured to modify the target trajectory such that a first offset amount at a first spot where a distance to the target vehicle is equal to a first distance becomes equal to a predetermined normal avoidance offset amount, in the target trajectory modification process.

7. The vehicle control apparatus according to claim 6, wherein the first distance is a distance at which a predicted time to collision of the vehicle with the target vehicle is equal to a predetermined predicted time to collision.

8. The vehicle control apparatus according to claim 6, wherein the at least one electronic control unit is configured to modify the target trajectory such that a second offset amount at a second spot that is located ahead of the first spot becomes equal to an offset amount that is equal to or larger than the predetermined normal avoidance offset amount, in the target trajectory modification process.

* * * * *